United States Patent [19]
Jensen

[11] 4,454,548
[45] Jun. 12, 1984

[54] BIAS CONTROL METHOD AND APPARATUS FOR MAGNETIC RECORDING

[75] Inventor: Joergen S. Jensen, Hjerm, Denmark

[73] Assignee: Bang and Olufsen A/S, Struer, Denmark

[21] Appl. No.: 318,868

[22] Filed: Nov. 6, 1981

Related U.S. Application Data

[63] Continuation-in-part of Ser. No. 293,150, Aug. 17, 1981.

[30] Foreign Application Priority Data

Aug. 20, 1981 [DK] Denmark .............................. 3686/81

[51] Int. Cl.$^3$ ......................... G11B 5/45; G11B 15/02
[52] U.S. Cl. ......................................... 360/66; 360/25
[58] Field of Search ....................... 360/66, 68, 31, 25

[56] References Cited

U.S. PATENT DOCUMENTS 4,263,624  4/1981  Gundry .................................. 360/66

Primary Examiner—Vincent I. Canney
Attorney, Agent, or Firm—Majestic, Gallagher, Parsons & Siebert

[57] ABSTRACT

An input signal and a variable amplitude AC bias signal are applied to a record head in a magnetic media recorder. The AC bias signal amplitude is controlled by a feedback circuit in response to the total active bias signal applied to the record head, the total active bias signal including the AC bias signal and the high frequency portion of the input signal.

7 Claims, 3 Drawing Figures

BIAS CONTROL METHOD AND APPARATUS FOR MAGNETIC RECORDING

This application is a continuation-in-part of my co-pending application Ser. No. 293,150, filed Aug. 17, 1981.

BACKGROUND OF THE INVENTION

The present invention relates to magnetic recording and more particularly to methods and means for controlling the bias as supplied to the record head during recording.

When tape or rather wire recording was originally invented, no bias was used in the recording head, i.e. only the magnetic signals as produced by the electric sound signals were transferred to the magnetic medium as it moved past the recording head. Later on it was discovered that the quality of the recording was improved when a constant DC bias was applied to the recording head, because the AC sound signal could then cause the medium to be magnetized without distortion due to the hysteresis phenomena. Still later it was discovered that a constant AC bias of a relatively high frequency was much better, because it did away with a noise problem caused by the DC bias and showed additional advantages especially with respect to the intensity of the recorded signal. Thus, with the use of an AC bias it is possible to create effective magnetic impressions of sound signals on modern tapes having a very thin layer of magnetic medium and being moved relatively slowly past the recorder head.

It has been found, however, that there are some problems connected with the adjustment of the intensity of the AC bias to an optimum, because it seems to be true that in the low end of the sound frequency spectrum the optimal bias intensity is higher than what is optimal for the frequencies of the high end of the spectrum. It is normal practice, therefore, to select a bias intensity which is optimal to a broad middle range of the sound frequency spectrum, while non-optimal to both the low and the high frequencies, whereby the magnetizing capacity of the tape is not fully utilized for these frequencies.

Sporadic attempts have been made to solve this problem, yet so far without real success. The attempts have concentrated on a dynamic or variable bias solution, whereby sensor means are used in an open loop system for steadily sensing the proportion of high or low frequencies in the sound signal and for controlling the intensity of the applied bias accordingly, i.e. such that the bias intensity is reduced whenever the sound signal has a relatively large proportion of high frequencies and/or increased when it is the low frequency proportion which is prevailing. These known solutions have resulted in certain improvements, but the control has not been fully stable, and the control criteria have not been particularly well defined, as they are mostly empirically based.

Thus, as known to those skilled in the art, any change of the bias intensity will affect various tape characteristics such as the sensitivity and the magnetizing capacity of the magnetic medium generally for all sound frequencies, and though a dynamically varying bias may well to some degree optimize the recording of the low or high sound frequencies, respectively, it will nevertheless be liable to disturb the correct uniform recording of the entire remaining major sound frequency range. Also for this reason the said known variable bias intensity systems have not brought about any real solution to the problem of providing for a generally optimized bias.

SUMMARY OF THE INVENTION

The invention, which relates to magnetic tape recording, is built on the important recognition that the active bias in the record head is constituted not only by the applied AC-bias, the frequency of which is usually considerably above the upper limit of the usable frequency range of the recording signal, but additionally by a portion of the recording signal itself, viz. the proportion constituted by the signal frequencies in the upper end of the usable frequency range, this proportion in fact acting as an active bias for the low frequency proportion of the signal. This is in close accordance with the said known observation that the applied bias may advantageously be reduced in dynamic dependence on a relative high proportion of high frequencies in the recording signal, but with the recognition according to the invention it will be possible to further optimize the applied bias, now based on a concretized knowledge of the factors, on which the total active bias depends. The novel recognition is converted into practice in that the tape recorder according to the invention should be designed such that a measuring circuit is connected to receive both the recording signal and the applied bias, whereby the measuring circuit produces an output signal which represents the total active bias which is used for controlling the applied bias through a feedback control circuit.

What is hereby measured as a basis for the control of the variable applied bias will be no less than just the total active bias, such that it is hereby possible to make use of a real control, while the known dynamic solutions have relied on some algorithmic control.

With the use of a real control circuit it is possible to achieve a highly improved and stabilized control, which via the control circuit may be given any desired characteristic, which may even be effectively optimized based on the new knowledge that the high frequency proportion of the recording signal form part of the total active bias. Quite generally, these considerations will inevitably enable an improved optimization of the active bias during magnetic recording.

An immediate result of the said novel recognition is that for a given total active bias the applied bias may be reduced corresponding to the high frequency proportion of the recording signal, and it will be understood that the control characteristic may thus be particularly simple, viz. corresponding to constancy of the total active bias.

Consequently, what is achievable is not only a highly stabilized control, but moreover a maintaining of the total bias at some desired level, and according to the foregoing remarks this may be of significant importance for an effective utilization of the recording tape, because the tape characteristics thereof will not then be changed by variations of the high frequency proportion of the recording signal.

Furthermore, with the use of the said control circuit it is possible in a very simple manner to enable a selective adjustment of the total active bias to the optimal value for the type of magnetic tape as actually used, as this may be a question of simply adjusting a basic voltage in the control circuit.

In a simple embodiment of the invention, the measurement of the combined bias is made as a voltage measurement direct on the terminals of the recorder head coil. An optimally representative measuring signal should be derived as an induced signal from an extra coil or winding on the recorder head, but the simplified measurement on the recorder head coil gives a perfectly usable signal. Yet another, but less advantageous possibility would be to measure the bias current through or over a series resistance in the record head coil connection, but a measurement made on the recorder head coil itself is to be preferred, because the measuring result will then reflect the impedance characteristic of the recorder head, and hereby the control circuit will be correspondingly easy to design for optimizing the bias at its place of application, viz. at the magnetisation gap of the recorder head.

BRIEF DESCRIPTION OF THE DRAWING

In the following the invention will be explained in more detail with reference to the accompanying drawing, in which:

FIG. 1 is a schematic diagram of a bias control system according to the invention, while

DETAILED DESCRIPTION OF THE PREFERRED EMBODIMENTS

Figure 1:
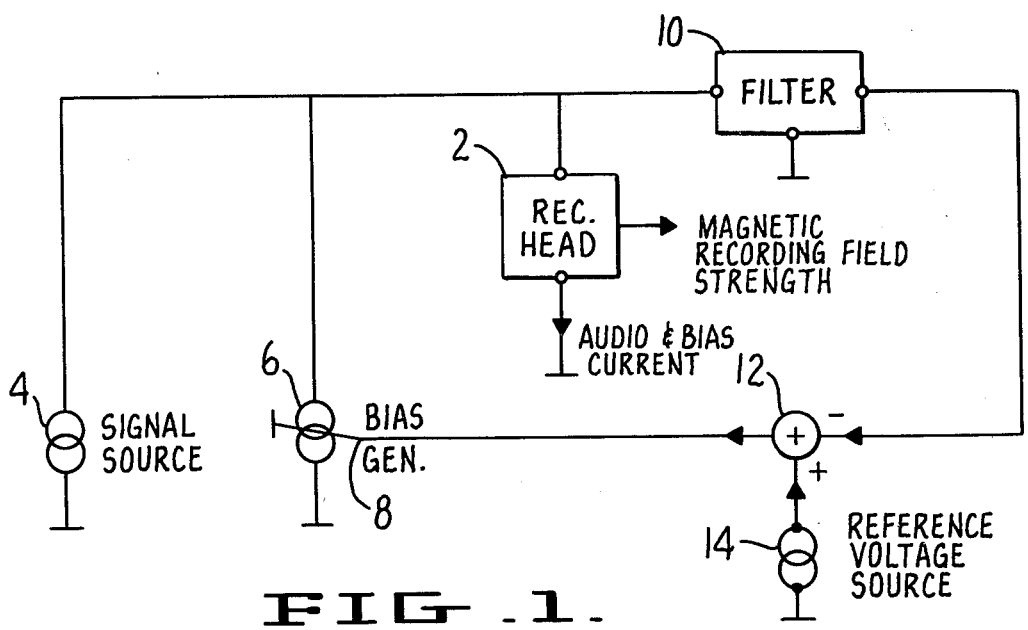

In FIG. 1 the reference numeral 2 designates a record head or a combined playing and recording head of a tape recorder. An input signal, such as an audio signal is supplied to the record head 2 from a signal source 4, and parallel therewith an AC bias signal of e.g. 100 kHz is supplied to the record head from a bias generator 6 of a type operable to produce an output bias signal of variable voltage as controlled by a control signal applied to a control signal input terminal 8.

The combined audio signal and bias signal as supplied to the record head 2 is also supplied to a frequency selective circuit 10 which is a high pass filter for frequencies in the high end of the spectrum recordable by the apparatus and thereabove. Thus, the output signal of the filter 10 will correspond to the sum of the bias voltage from the generator 6 and the high frequency contents of the audio signal from the signal source 4, and this output signal is fed to a comparator 12, in which the signal is subtracted from a constant reference signal as produced by a reference signal generator 14. The output signal of the comparator 12 is applied to the bias generator 6 as a control signal fed to the control input terminal 8.

When the audio signal shows a high proportion of relatively high sound frequencies the comparator 12 will produce a low output signal, because the filter 10 will show a high output to be subtracted from the constant reference signal. The bias generator 6 is so adapted that its bias output is adjusted in response to control signal input on the terminal 8, i.e. in the discussed situation the bias output or applied bias will be relatively weak, corresponding to an optimal bias because of the inherent bias effect of the high sound frequencies.

If or when the audio signal changes so as to show a reduced content of high frequencies, then the output of the filter 10 will decrease, and consequently the control output of the comparator 12 will increase, i.e. in this situation the bias generator 6 will produce a bias signal of increased voltage, which is desirable because the inherent bias effect of the high sound frequencies is correspondingly reduced.

The system is easily adjustable so as to ensure that the magnitude of the substantially constant active bias will correspond to the optimal bias level for the tape as used, because this will mainly be a question of selecting a suitable reference voltage of the generator 14. Selector means may be provided for enabling the reference voltage to be appropriately changed if a different type of tape is to be recorded.

The transfer function of the filter 10 may be unchanged for different types of recording tape. The filter should rather be adapted to the recording characteristic of the recorder itself, such that the upper limit of the sound frequency range as recordable by the particular type of recorder should correspond approximately to the cut off frequency of the filter. This will require that a full high frequency audio signal to be recorded produces a maximum output from the comparator 12 corresponding to a minimum of applied bias. The applied bias will then increase as the high frequency contents of the audio signal decreases.

The transfer function of the filter 10 in the effective or recordable frequency range may well be as simple as possible, viz. rising at 6 dB/octave up to the cut off frequency.

Figure 2:
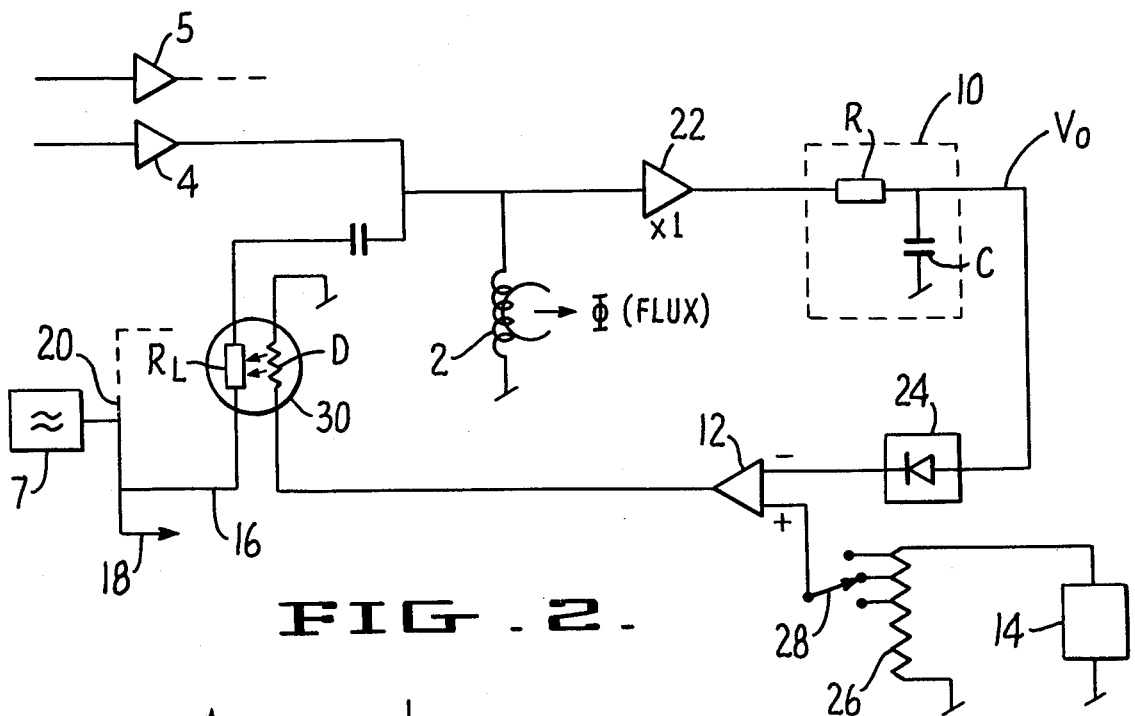
FIG. 2 is a more detailed diagram thereof.

In FIG. 2 is shown a more detailed example, in which the record head is again designated 2, now representing one half of a double stereo recorder head. The audio signal source 4 is one of the two amplifiers of a standard stereo tape recorder, the other being indicated at 5. The bias generator is designated 7; it is constituted by a conventional combined bias and erase oscillator producing an AC current e.g. at 100 kHz both to the recorder head 2, as a bias through a wire 16, and through a wire 18 to an erase head (not shown) operating to erase the tape track prior to its passage by the recorder head. Moreover, the oscillator 7 also supplies a corresponding AC current, through a wire 20, to the corresponding recorder head portions pertaining to the other channel or track of the stereo tape. The full circuit of the bias control means is illustrated for one of these channels only, but a similar circuit exists for the other channel as well.

The filter 10 is a simple passive network including a resistor R and a capacitor C. It is assumed that the upper limit of the effective frequency range of the recorder is some 18 kHz, and the RC high pass filter 10 is then designed to show the same 18 kHz as its cut off frequency. In front of the filter is placed a buffer amplifier 22 ensuring that the record head 2 receives the full intensity of the combined audio and bias signal despite the presence of the filter 10.

The comparator 12 is a differential amplifier receiving on its minus input terminal the output signal of the filter 10 as rectified through a rectifier 24 and receiving on its plus input terminal a DC voltage derived from a voltage divider 26 through a selector 28, the voltage divider 26 being connected to a constant voltage source 14. The selector 28 is set to meet the general bias requirements of a particular type of tape to be recorded.

The said applied bias as produced by the oscillator 7 is fed to the recorder head 2 through a so-called photo coupler 30 controlled by the output of the differential amplifier 12, i.e. through a light sensitive resistor $R_L$ exposed to the variable light intensity from a lamp or light emitting diode D operated by the amplifier 12 in inverted relationship with the intensity of the output from the filter 10.

It will be appreciated that the system shown in FIG. 2 operates exactly according to the description of FIG. 1 in that the filter 10 receives input information of the sum of the applied bias signal and the high frequency proportion of the audio signal and causes the applied bias to be dynamically adjusted in accordance with the relative lack of bias producing high sound frequencies in the sound signal, such that the total or active bias is dynamically maintained substantially constant in a very simple manner by means of a feedback control loop system.

Figure 3:
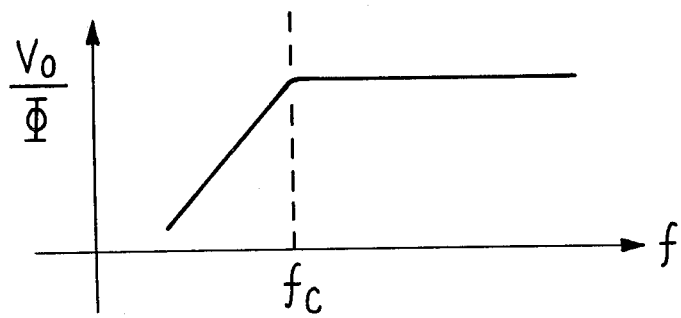
FIG. 3 is a plot of the transfer function of the filter used in embodiment of FIGS. 1 and 2.

The transfer function of the filter 10 is illustrated in FIG. 3. Both axes are logarithmic. The function is constant for frequencies beyond the cut off frequency $f_c$, which should preferably correspond to the upper limit of the operative frequency range of the recorder, normally somewhere between 10 and 20 kHz. For frequencies decreasing from the characteristic frequency the transfer function falls off at 6 dB/octave.

The invention is not in any way limited to the embodiments shown and described. Especially in connection with professional recording equipment the invention will comprise the method of maintaining the said active bias substantially constant irrespectively of the detailed design of the control circuitry, and the invention is not either limited to conventional sound recording, because the main problems in question relate to the interaction between the recorder head and the tape and more precisely to the recording frequency versus the speed of the tape. Thus, the same problems are encountered when the recording frequencies are much higher than ordinary sound frequencies and the tape speed relative the recorder head is correspondingly much higher than in ordinary sound recorders, e.g. in video recorders, and the principles of the present invention will equally apply to the recording of other kinds of signals, whenever the relative speed between the recorder head and the tape compared with the frequencies to be recorded corresponds to the operation conditions of a conventional sound recorder.

What is claimed is:

1. Apparatus for recording an input signal on a magnetic medium comprising:
    record head means for recording on the magnetic medium,
    variable amplitude AC bias signal generator means,
    means for applying the input signal and bias signal to said record head means, and
    feedback circuit means for controlling the bias generator means, measuring the total active bias signal resulting from the sum of the applied variable bias signal and the high frequency portion of the input signal applied to the recording and having its output applied to control the bias generator.

2. Apparatus according to claim 1 in which said feedback circuit means controls the bias signal generator to provide dynamically a substantially constant total active bias signal amplitude at the recording head.

3. Apparatus according to claims 1 or 2 wherein said feedback circuit means comprises
    frequency selective circuit means for passing the total active bias signal,
    reference signal generator means, and
    comparator means for comparing the reference signal amplitude and the total active bias signal amplitude to generate a control signal for controlling the bias generator.

4. Apparatus according to claim 3 wherein the frequency selective circuit means comprises filter circuit means having a cut off frequency at a frequency corresponding approximately to the upper frequency limit recordable by the apparatus.

5. Apparatus according to claim 4 wherein the filter circuit means comprises a high pass filter having a 6 dB/octave characteristic rising up to the cut off frequency.

6. Apparatus according to claim 3 further comprising means for adjusting the reference signal amplitude according to the type of tape used in the recorder, whereby the amplitude of the substantially constant total active bias signal at the recording head is selectable.

7. Apparatus according to claim 3 wherein the record head means has a coil and the input of the feedback circuit means is connected to said coil.

* * * * *